United States Patent
Hojoh (10) Patent No.: US 12,442,706 B2
(45) Date of Patent: Oct. 14, 2025

(54) DIAPHRAGM PRESSURE GAUGE AND COMPOUND PRESSURE GAUGE

(71) Applicant: Q'z CORPORATION, Kodaira (JP)

(72) Inventor: Hisao Hojoh, Musashino (JP)

(73) Assignee: Q'z Corporation, Kodaira (JP)

( * ) Notice: Subject to any disclaimer, the term of this patent is extended or adjusted under 35 U.S.C. 154(b) by 239 days.

(21) Appl. No.: 18/066,358

(22) Filed: Dec. 15, 2022

(65) Prior Publication Data

US 2023/0304883 A1 Sep. 28, 2023

(30) Foreign Application Priority Data

Mar. 22, 2022 (JP) .................... 2022-045867

(51) Int. Cl.
| | | |
|---|---|---|
| *G01L 21/00* | (2006.01) | |
| *G01L 13/02* | (2006.01) | |
| *G01L 21/32* | (2006.01) | |

(52) U.S. Cl.
CPC .......... *G01L 13/026* (2013.01); *G01L 13/023* (2013.01); *G01L 21/00* (2013.01); *G01L 21/32* (2013.01)

(58) Field of Classification Search
CPC ..... G01L 13/026; G01L 13/023; G01L 21/32; G01L 9/0022; G01L 9/003; G01L 9/008; G01L 19/04; G01L 19/0645; G01L 19/142; G01L 19/149; G01L 21/30; G01L 19/0636; G01L 9/0041; G01L 21/00; H01J 41/06
USPC .......................................... 73/716–722, 756
See application file for complete search history.

(56) References Cited

U.S. PATENT DOCUMENTS

| | | |
|---|---|---|
| 5,488,868 A | 2/1996 | Ootake et al. |
| 11,181,430 B2 | 11/2021 | Hojoh |
| 2009/0241678 A1* | 10/2009 | Motoyama ............ G01L 9/0033 73/717 |
| 2009/0308168 A1 | 12/2009 | Motoyama |
| 2010/0090703 A1 | 4/2010 | Boardwine et al. |

(Continued)

FOREIGN PATENT DOCUMENTS

| | | |
|---|---|---|
| EP | 3 779 384 A1 | 2/2021 |
| JP | H07-019981 A | 1/1995 |

(Continued)

OTHER PUBLICATIONS

Extended European Search Report (Application No. 22213007.2) dated Oct. 11, 2023 (15 pages).

(Continued)

*Primary Examiner* — Robert R Raevis
(74) *Attorney, Agent, or Firm* — BURR PATENT LAW, PLLC (57) ABSTRACT

A diaphragm pressure gauge includes: a structure disposed under pressure to be measured; two diaphragms attached to the structure so as to oppose each other; and a detection element that is fixed to the two diaphragms to detect displacements of the two diaphragms. In each of the two diaphragms, when one of two surfaces is designated an opposing surface and the other surface is designated a non-opposing surface, the structure and the two diaphragms set a space faced by one of the opposing surface and the non-opposing surface as an airtight space to be kept in a reference vacuum, and the other of the opposing surface and the non-opposing surface is subjected to the pressure to be measured.

14 Claims, 11 Drawing Sheets

(56) References Cited

U.S. PATENT DOCUMENTS

| | | |
|---|---|---|
| 2012/0210799 A1* | 8/2012 | Motoyama ............ G01L 19/145 73/715 |
| 2019/0107458 A1 | 4/2019 | Hojoh |
| 2020/0232861 A1 | 7/2020 | Hojoh |
| 2021/0096035 A1 | 4/2021 | Kelly et al. |

FOREIGN PATENT DOCUMENTS

| | | |
|---|---|---|
| JP | H07-294355 A | 11/1995 |
| JP | 2007-024849 A | 2/2007 |
| JP | 2010-025582 A | 2/2010 |
| JP | 2010-054518 A | 3/2010 |
| JP | 2010-096763 A | 4/2010 |
| JP | 6744636 B2 | 8/2020 |
| KR | 10-2011-0022884 A | 3/2011 |

OTHER PUBLICATIONS

Partial European Search Report dated Sep. 7, 2023 (Application No. 22213007.2).

* cited by examiner

DIAPHRAGM PRESSURE GAUGE AND COMPOUND PRESSURE GAUGE

CROSS REFERENCE TO RELATED APPLICATION

This application is based upon and claims the benefit of priority to Japanese Patent Application No. 2022-045867 filed on Mar. 22, 2022, the entire contents of which are incorporated herein by reference.

BACKGROUND

The present disclosure relates to a diaphragm pressure gauge and a compound pressure gauge to be disposed under pressure to be measured.

A vacuum gauge to be disposed under pressure to be measured is called a nude vacuum gauge and, as described in JP-A-2010-096763 and JP-A-2007-024849, an ionization vacuum gauge (a hot cathode ionization gauge or a cold cathode ionization gauge) is known. On the other hand, as described in JP-B-6744636, a diaphragm pressure gauge that uses a diaphragm is disposed in an atmosphere at atmospheric pressure, and pressure to be measured acts on one surface of the diaphragm disposed in an airtight container while a reference vacuum acts on the other surface of the diagram.

In addition, as a compound vacuum gauge capable of measuring atmospheric pressure to a high-vacuum region, a vacuum gauge combining an ionization vacuum gauge, a Pirani vacuum gauge, and an atmospheric pressure sensor, and a vacuum gauge combining an ionization vacuum gauge and a quartz friction vacuum gauge are known. A compound vacuum gauge using a hot cathode ionization gauge as the ionization vacuum gauge has higher accuracy than a compound vacuum gauge using a cold cathode ionization gauge and is used in process pressure control.

A cold cathode ionization gauge is inferior in terms of accuracy as compared to a hot cathode ionization gauge and, in particular, staining or wear of electrodes that accompanies a discharge phenomenon occurs when the pressure to be measured is high. However, a structure is adopted that enables consumables to be readily replaced. While a hot cathode ionization gauge does not share the problem described above of a cold cathode ionization gauge, a hot cathode ionization gauge has a filament that is a heat source. An ionization vacuum gauge (a hot cathode ionization gauge or a cold cathode ionization gauge) used as a nude vacuum gauge cannot be used in a low-vacuum region to be measured. One reason therefor is that, when partial pressure of oxygen is high, wear occurs in electrodes in a cold cathode ionization gauge and in a filament in a hot cathode ionization gauge and, particularly in the case of a thin filament, breaking occurs due to its narrowness. Another reason is that, since there are a large number of molecules that collide with electrons emitted from the filament, an ionic current increases and sensitivity declines. On the other hand, with a diaphragm pressure gauge that is disposed in an atmosphere at atmospheric pressure without being used as a nude vacuum gauge, measured values fluctuate depending on environmental temperature. In particular, measurement error increases when pressure to be measured is low and accurate pressure measurement cannot be performed.

In addition, a conventional compound pressure gauge capable of measuring atmospheric pressure to a high-vacuum region requires that at least three types (a hot cathode ionization gauge, a Pirani vacuum gauge, and an atmospheric pressure sensor) be combined. Alternatively, since a pressure reading of a Pirani vacuum gauge or a quartz friction vacuum gauge used to measure a low-vacuum region in a compound pressure gauge is affected by a process gas composition due to a difference in sensitivity depending on gas species, it is difficult to accurately measure true pressure in real-time.

An object of the disclosure is to provide a diaphragm pressure gauge to be disposed under pressure to be measured that is capable of measuring pressure equal to or lower than atmospheric pressure without depending on environmental temperature and gas species.

Another object of the disclosure is to provide a compound pressure gauge capable of measuring pressure in a wide range from atmospheric pressure to a high vacuum without depending on environmental temperature by combining two types of vacuum gauges including the diaphragm pressure gauge described above.

DESCRIPTION OF EXEMPLARY EMBODIMENTS

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

(1) In accordance with one of some aspects, there is provided a diaphragm pressure gauge, comprising:
 a structure disposed under pressure to be measured;
 two diaphragms attached to the structure so as to oppose each other; and
 a detection element that is fixed to the two diaphragms to detect displacements of the two diaphragms, wherein
 in each of the two diaphragms, when one of two surfaces is designated an opposing surface and another surface is designated a non-opposing surface, the structure and the two diaphragms set a space faced by one of the opposing surface and the non-opposing surface as an airtight space to be kept in a reference vacuum, and the other of the opposing surface and the non-opposing surface is subjected to the pressure to be measured.

According to one of some aspects, in each of two diaphragms disposed so as to oppose each other, a reference vacuum acts on one of two surfaces while pressure to be measured acts on the other surface, and the diaphragms are displaced according to a differential pressure between the reference vacuum and the pressure to be measured. Therefore, since a force itself that acts on an area of a gas molecule to be measured is measured regardless of gas species, accurate gas pressure to be measured can be detected. Since displacements of the two diaphragms are equal in absolute values but opposite in directions, even if each displacement is small and ranges from, for example, 7 μm to 10 μm, sensitivity is doubled. The displacements of the two diaphragms are converted into signals proportional to pressure based on signals from a detection element. A piezoelectric element, a capacitance detection element, and the like can be used as the detection element. In particular, when the piezoelectric element is a crystal oscillator or a double tuning-fork crystal oscillator, the displacements of the two diaphragms are detected as a change in frequency of the crystal oscillator and an output signal proportional to the pressure to be measured is obtained. The diaphragm pressure gauge is capable of measuring pressure to be measured between atmospheric pressure and a reference vacuum.

In this case, since the diaphragm pressure gauge is disposed under pressure to be measured and does not require a heat source as in a hot cathode ionization gauge, a temperature of a measuring atmosphere is always the same as a temperature of an atmosphere under pressure to be measured. Therefore, in pressure to be measured from atmospheric pressure to a low vacuum, measurement error with respect to a temperature fluctuation in environmental temperature is small. The closer the pressure to be measured is to a high vacuum, the higher a vacuum adiabatic effect with respect to environmental temperature. Therefore, pressure to be measured between atmospheric pressure and a reference vacuum can be accurately measured.

(2) In accordance with the aspect (1), the structure may include: an inner structure that supports the two diaphragms disposed so as to oppose each other; and an outer structure including an opening inside which the inner structure is supported, the opening exposing the non-opposing surface of the two diaphragms in an atmosphere at the pressure to be measured. Accordingly, the airtight space that is airtightly enclosed by the two diaphragms, the inner structure, and the outer structure is set to the reference vacuum, the reference vacuum acts on the opposing surface, and the pressure to be measured acts on the non-opposing surface.

(3) In accordance with the aspect (1), the structure may include: an outer structure, the airtight space provided inside of the outer structure is set to the reference vacuum; and an inner structure that is supported by the outer structure and is disposed inside the outer structure, and that is insulated by the reference vacuum. The inner structure may include: an introduction pipe that has an inlet for a gas at the pressure to be measured at a protruding end that protrudes outward from the outer structure; and an inner chamber that is set to the pressure to be measured via the introduction pipe. In this case, the two diaphragms function as partitions of a part of the inner chamber, the pressure to be measured acts on the opposing surface, and the reference vacuum acts on the non-opposing surface.

(4) In accordance with the aspect (3), the inner chamber may include: a first chamber that is set to the pressure to be measured via the introduction pipe; a second chamber that is communicated with the inside of the outer structure and airtightly separated from the first chamber; and bellows that partitions the first chamber and the second chamber, that is coupled to the two diaphragms, and that is capable of deforming so as to allow displacements of the two diaphragms. In this case, the opposing surface each of the two diaphragms is disposed so as to face the inside of the first chamber and the detection element is disposed in the second chamber.

(5) In accordance with any one of the aspects (1) to (4), the structure may be attached via a thermal insulator to a fixing member that disposes and fixes the structure under the pressure to be measured. Accordingly, even when the fixing member receives a fluctuation in environmental temperature, solid heat transfer of the environmental temperature can be blocked by the thermal insulator.

(6) In accordance with any one of the aspects (1) to (5), the diaphragm pressure gauge may further comprise a deposition preventive shield and/or a heat shield that surrounds the structure and that is at least partially capable of allowing a gas to be measured to pass. Accordingly, even when, for example, a deposition source is disposed under the pressure to be measured, particles or heat from the deposition source can be blocked.

(7) In accordance with any one of the aspects (1) to (6), the detection element may be a crystal oscillator. The crystal oscillator is capable of measuring pressure to be measured from atmospheric pressure to a high-vacuum region such as $10^{-2}$ Pa.

(8) In accordance with another one of some aspects, there is provided a compound pressure gauge comprising:
 the diaphragm pressure gauge according to the aspect (7); and
 an ionization vacuum gauge disposed under pressure to be measured, wherein
 a measurement region of the diaphragm pressure gauge and a measurement region of the ionization vacuum gauge overlap with each other.

According to another one of some aspects, since a measurement region of the diaphragm pressure gauge and a measurement region of the ionization vacuum gauge overlap with each other, pressure to be measured from atmospheric pressure to a high vacuum or an ultrahigh vacuum can be measured by a single compound pressure gauge. While the ionization vacuum gauge may be either a hot cathode ionization gauge or a cold cathode ionization gauge, a hot cathode ionization gauge is preferable from the perspective of accuracy. Since the compound pressure gauge is to be disposed under pressure to be measured, a temperature of a measuring atmosphere is always the same as a temperature of an atmosphere under pressure to be measured. In this case, in pressure to be measured from atmospheric pressure to a low vacuum, measurement error with respect to a temperature fluctuation in ambient air is small and besides the pressure to be measured in this range can be measured by the diaphragm pressure gauge according to the aspect (7) that does not include a heat source. On the other hand, pressure to be measured at a high vacuum is mainly measured by the ionization vacuum gauge and, in particular, the hot cathode ionization gauge including a heat source. With an ionization vacuum gauge, although there is a difference in sensitivity depending on gas species, since a proportional relationship is guaranteed between an ionic current (measured value) and pressure, relative accuracy of pressure is as reliable as accuracy of reading. Therefore, pressure to be measured from atmospheric pressure to a high vacuum or an ultrahigh vacuum can be accurately measured.

(9) In accordance with the aspect (8), a measurement region of the diaphragm pressure gauge and a measurement region of the ionization vacuum gauge may overlap with each other by a range of 0.01 to 10.0 Pa. In this case, the diaphragm pressure gauge can have a measurement region from atmospheric pressure to 0.01 Pa and the ionization vacuum gauge can have a measurement region being a vacuum region lower than 10.0 Pa. The overlap region of the measurement regions may be 0.1 to 10.0 Pa or 0.1 to 1.0 Pa.

(10) In accordance with the aspect (8) or (9), an ionic current value of the ionization vacuum gauge may be converted into a nitrogen equivalent, and a level of a measured value of the diaphragm pressure gauge may be shifted so as to be consistent with an upper limit of the nitrogen equivalent of the ionization vacuum gauge. Accordingly, measured values from atmospheric pressure to a high vacuum or an ultrahigh vacuum exhibit linear characteristic.

Hereinafter, embodiments of the disclosure will be described with reference to the drawings.

1. First Embodiment

Figure 1:
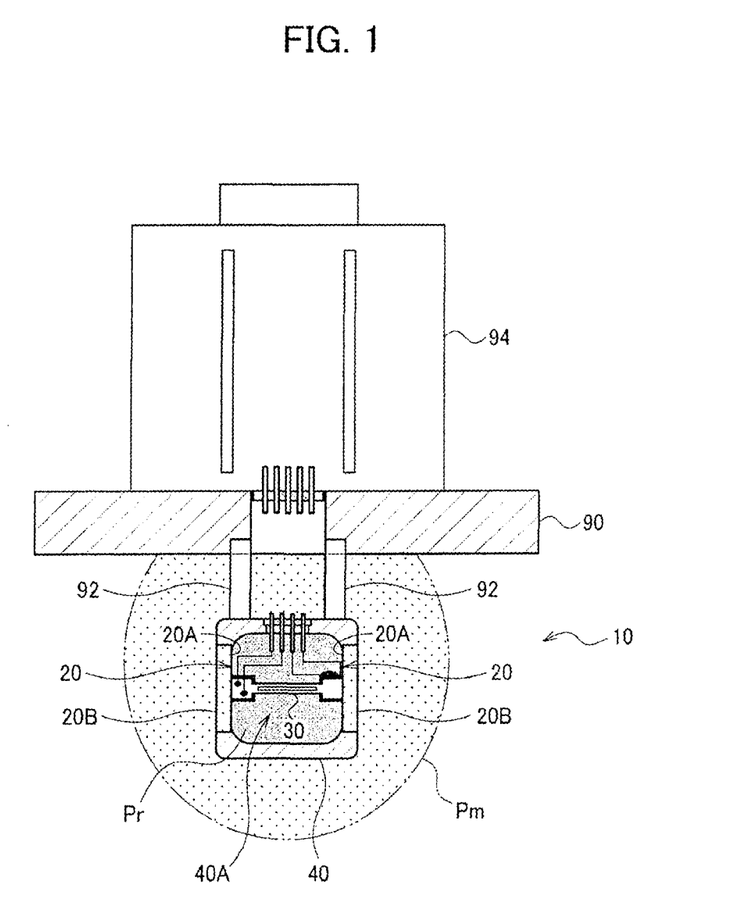
FIG. 1 is a sectional view illustrating a diaphragm pressure gauge according to a first embodiment of the disclosure.

FIG. 1 illustrates a diaphragm pressure gauge 10 according to a first embodiment of the disclosure. The diaphragm pressure gauge 10 includes two diaphragms 20, a detection element 30, and a structure 40. The structure 40 is disposed under pressure to be measured (Pm). The two diaphragms 20 are attached to the structure 40 so as to oppose each other. The detection element 30 is fixed to the two diaphragms 20. A flange 90 is a fixing member that disposes and fixes the structure 40 under the pressure to be measured (Pm). The flange 90 disposes the structure 40 under the pressure to be measured (Pm) by being attached to, for example, a vacuum chamber, and the like. The structure 40 can be attached to the flange 90 via a thermal insulator 92. Accordingly, even when the flange 90 is affected by environmental temperature, solid heat transfer of the environmental temperature can be blocked by the thermal insulator 92. A circuit block 94 including a drive circuit that drives the detection element 30, a signal output circuit, and the like is fixed to an atmosphere side of the flange 90. The detection element 30 that detects displacements of the two diaphragms 20 is, for example, a piezoelectric element such as an oscillator. The oscillator 30 is oscillated by an oscillator circuit that is a drive circuit and a resonant resistance Z of the oscillator 30 is obtained. Pressure of gas can be measured from a difference $\Delta Z$ ($=Z-Z_0$) between the measured resonant resistance Z and a natural resonant resistance $Z_0$ (a value at a high vacuum).

In each of the two diaphragms 20, one of two surfaces is designated an opposing surface 20A and the other surface is designated a non-opposing surface 20B. The structure 40 and the two diaphragms 20 set a space faced by one of the opposing surface 20A and the non-opposing surface 20B (the opposing surface 20A in FIG. 1) as an airtight space 40A to be kept in a reference vacuum (Pr). The other of the opposing surface 20A and the non-opposing surface 20B (the non-opposing surface 20B in FIG. 1) is subjected to the pressure to be measured (Pm).

According to the present embodiment, in each of the two diaphragms 20 disposed so as to oppose each other, a known reference vacuum (Pr) acts on the opposing surface 20A being one of the two surfaces while the pressure to be measured (Pm) acts on the non-opposing surface 20B being the other surface of the two surfaces, and the diaphragms 20 are displaced according to a differential pressure between the reference vacuum and the pressure to be measured. Since displacements of the two diaphragms 20 are equal in absolute values but opposite in directions, even if each displacement is small and ranges from, for example, 7 μm to 10 μm, sensitivity is doubled. Furthermore, by fixing the detection element 30 between the two diaphragms 20, a pressure measurement error that occurs due to the diaphragms' self-weight in a conventional diaphragm pressure gauge can be canceled. In other words, an error that may occur due to an attaching posture of a vacuum gauge is resolved. In this manner, the displacements of the two diaphragms 20 are converted into signals proportional to pressure by the detection element 30. In particular, when the piezoelectric element 30 is a crystal oscillator or a double tuning-fork crystal oscillator, the displacements of the two diaphragms 20 are detected as a change in frequency of the crystal oscillator and an output signal proportional to the pressure to be measured (Pm) is obtained. Accordingly, the pressure to be measured (Pm) between atmospheric pressure and a reference vacuum can be measured.

Figure 2:
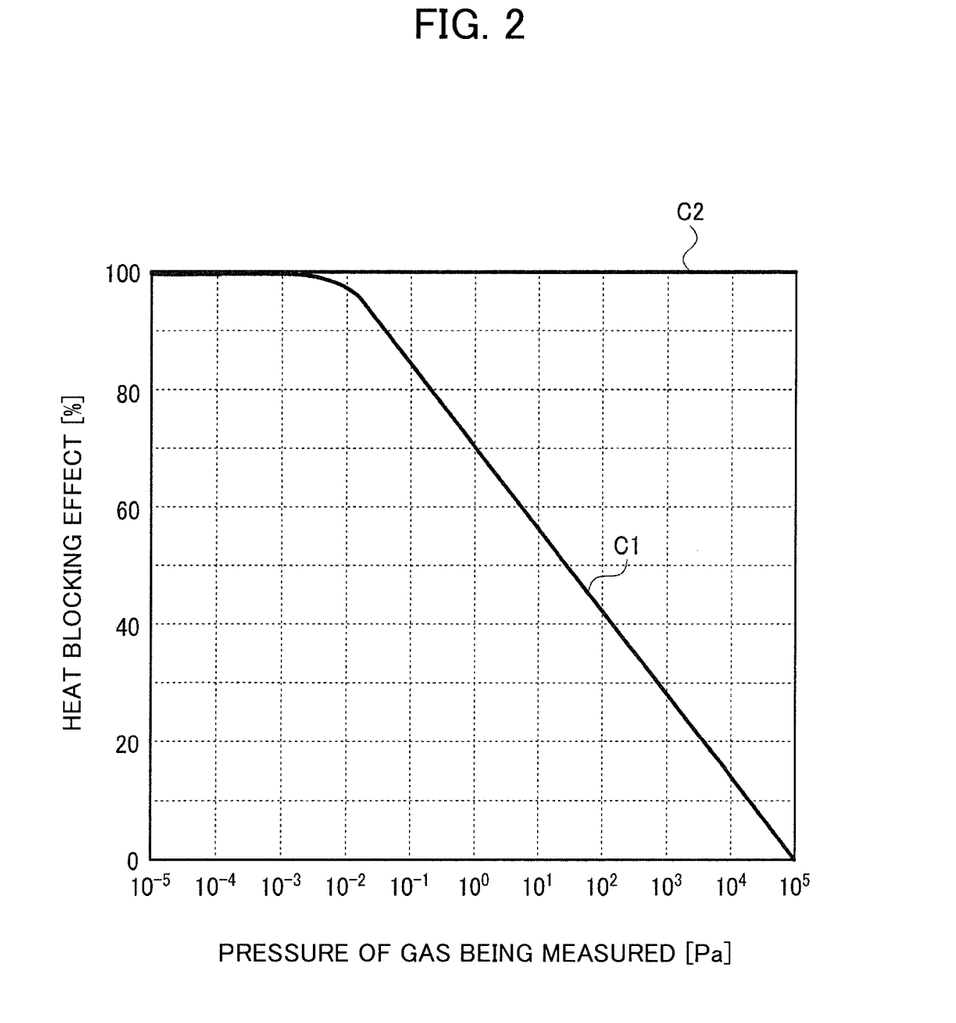
FIG. 2 is a characteristic diagram illustrating a correlation between pressure to be measured and a heat blocking effect.

In this case, since the structure 40 of the diaphragm pressure gauge 10 is disposed under the pressure to be measured (Pm) and does not require a heat source like an ionization vacuum gauge, a temperature of a measuring atmosphere is always the same as a temperature of an atmosphere under the pressure to be measured (Pm). FIG. 2 illustrates a correlation between the pressure to be measured (Pm) and a heat blocking effect. Generally, a vacuum region with lower pressure than atmospheric pressure ($1.013 \times 10^5$ Pa) is classified into a low vacuum ($10^5$ to $10^2$ Pa), a medium vacuum ($10^2$ to $10^{-1}$ Pa), and a high vacuum ($10^1$ to $10^5$ Pa). As illustrated in FIG. 2, when the pressure to be measured (Pm) ranges from atmospheric pressure (approximately $10^5$ Pa) to a high vacuum ($10^2$ Pa), a heat blocking effect of the pressure to be measured (Pm) changes from 0% to 100% and the heat blocking effect reaches 100% on a high-vacuum side ($10^{-2}$ to $10^{-5}$ Pa) of, for example, $10^2$ Pa. In other words, when the pressure to be measured (Pr) is in the high-vacuum region ($10^{-1}$ to $10^{-5}$ Pa), a vacuum adiabatic effect with respect to outside temperature is high. On the other hand, a measurement error accompanying a pressure fluctuation with respect to temperature is smaller when the pressure to be measured (Pm) ranges from atmospheric pressure to a medium vacuum ($10^5$ to $10^{-1}$ Pa) than in a high vacuum ($10^{-1}$ to $10^{-5}$ Pa). Therefore, when the pressure to be measured (Pm) ranges from atmospheric pressure to a medium vacuum ($10^5$ to $10^{-1}$ Pa), even if the heat blocking effect of the pressure to be measured (Pm) is small, a measurement error accompanying a pressure fluctuation with respect to temperature can be ignored. Therefore, the pressure to be measured (Pm) between atmospheric pressure and a high vacuum can be accurately measured.

Figures 3A, 3B, 3C:
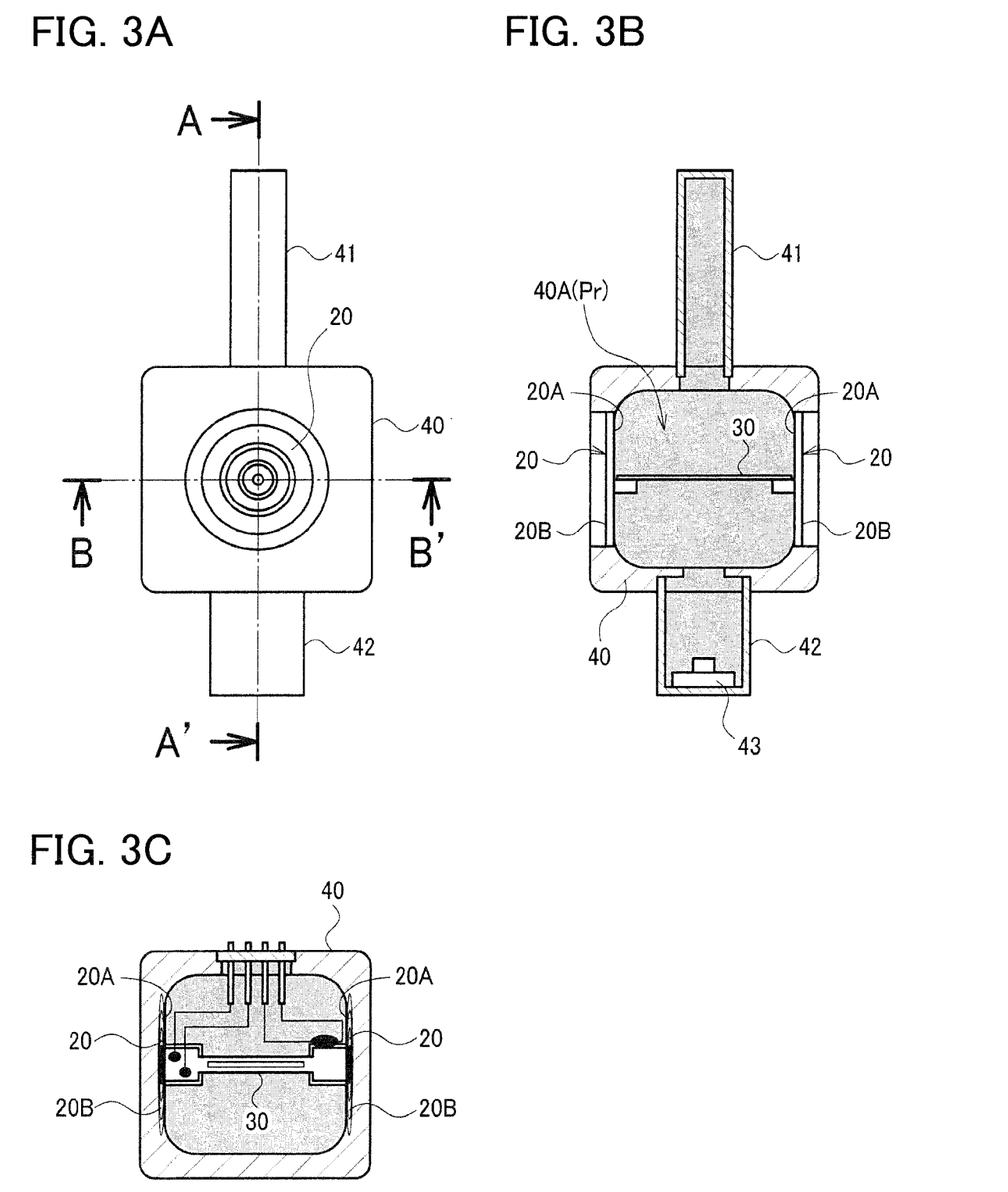
FIG. 3A to FIG. 3C are diagrams illustrating an example of the diaphragm pressure gauge illustrated in FIG. 1.

As illustrated in FIG. 3A to FIG. 3C, the structure 40 can include an exhaust pipe 41 and a pump storage 42 that are communicated with the airtight space 40A. A deactivated getter pump 43 is stored in the pump storage 42. For example, in a state where one face of the cubed structure 40 has been opened, the two diaphragms 20 are attached to the structure 40 and, at the same time, both ends of the oscillator 30 are fixed to the two diaphragms 20. Subsequently, a lid is fixed to the one open face of the structure 40. A heater is wound around the pump storage 42 to activate the getter pump 43 at, for example, 500° C. for, for example, 1 hour and, in doing so, gas is exhausted by a vacuum pump from a released end of the exhaust pipe 41. Subsequently, the pump storage 42 is cooled and the end of the exhaust pipe 41 is sealed. When the getter pump 43 is activated in this state, the airtight space 40A is set to the reference vacuum (Pr) of, for example, $10^{-5}$ Pa.

Figure 4A:
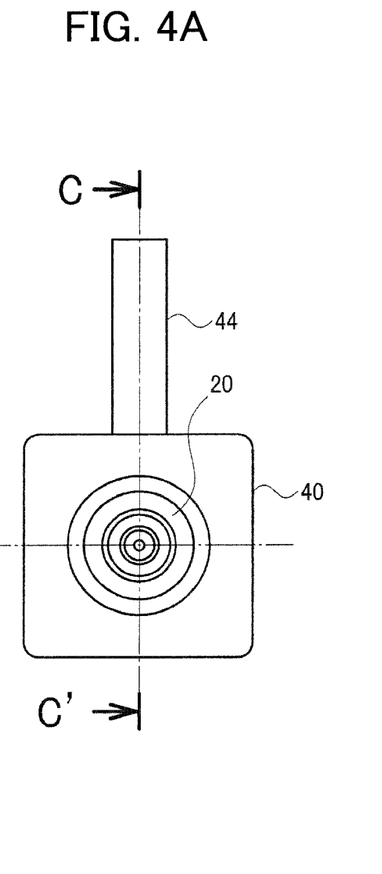
FIG. 4A and FIG. 4B are diagrams illustrating another example of the diaphragm pressure gauge illustrated in FIG. 1.
Figure 4B:
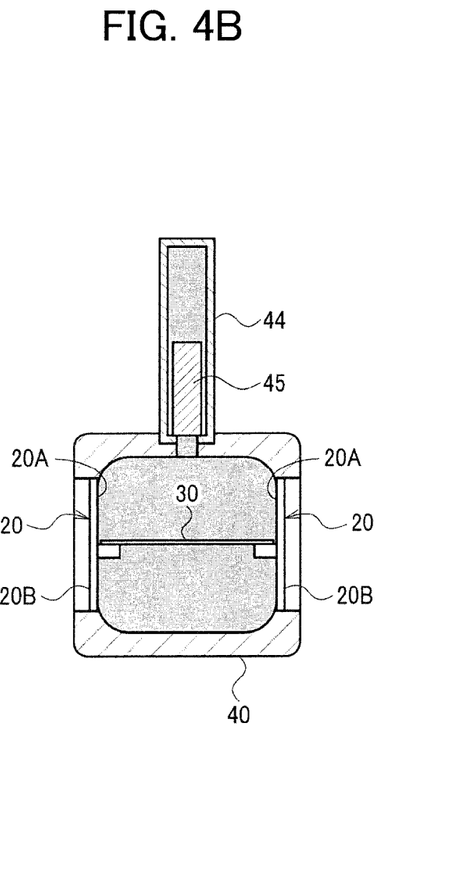

Alternatively, as illustrated in FIG. 4A and FIG. 4B, the structure 40 may include an exhaust pipe 44 that is communicated with the airtight space 40A. The exhaust pipe 44 can double as a storage for storing a getter pump 45.

Figure 5:
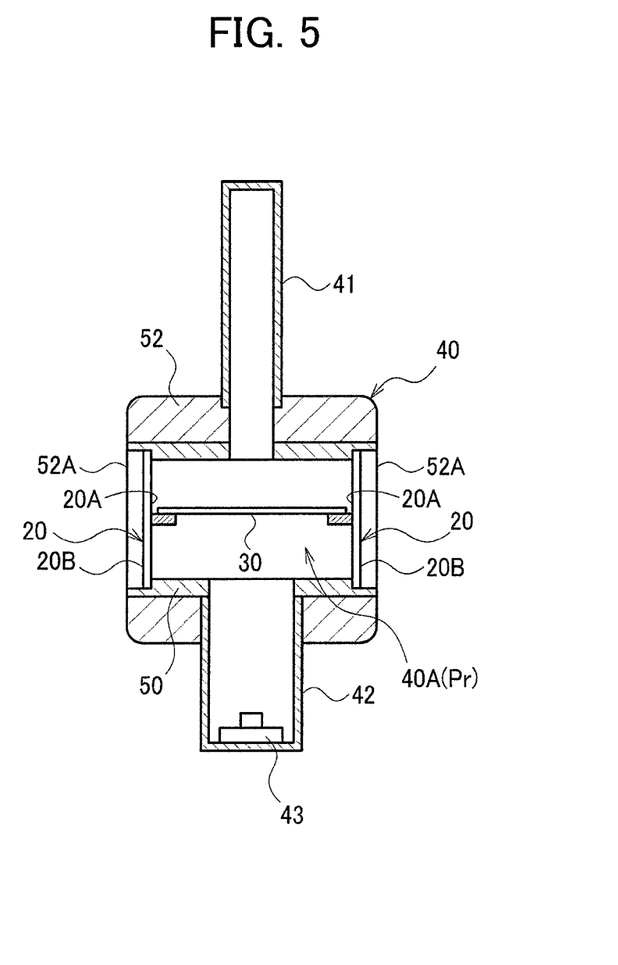
FIG. 5 is a diagram illustrating yet another example of the diaphragm pressure gauge illustrated in FIG. 1.

Alternatively, as illustrated in FIG. 5, the structure 40 may include an inner structure 50 and an outer structure 52. The inner structure 50 supports the two diaphragms 20 that are disposed so as to oppose each other. The outer structure 52 can include an opening 52A inside which the inner structure 50 is supported and exposes the non-opposing surface 20B of the two diaphragms 20 in an atmosphere at the pressure to be measured (Pm). Accordingly, the airtight space 40A that is airtightly enclosed by the two diaphragms 20, the inner structure 50, and the outer structure 52 is set to the reference vacuum (Pr). In this case, the reference vacuum (Pr) acts on the opposing surface 20A and the pressure to be measured (Pm) acts on the non-opposing surface 20B. After attaching the two diaphragms 20 and the detection element 30 to the inner structure 50, the inner structure 50 is disposed and fixed inside the outer structure 52. Accordingly, an assembly step is made to be easier than that of the structure 40 illustrated in FIG. 3A to FIG. 3C.

Figure 6:
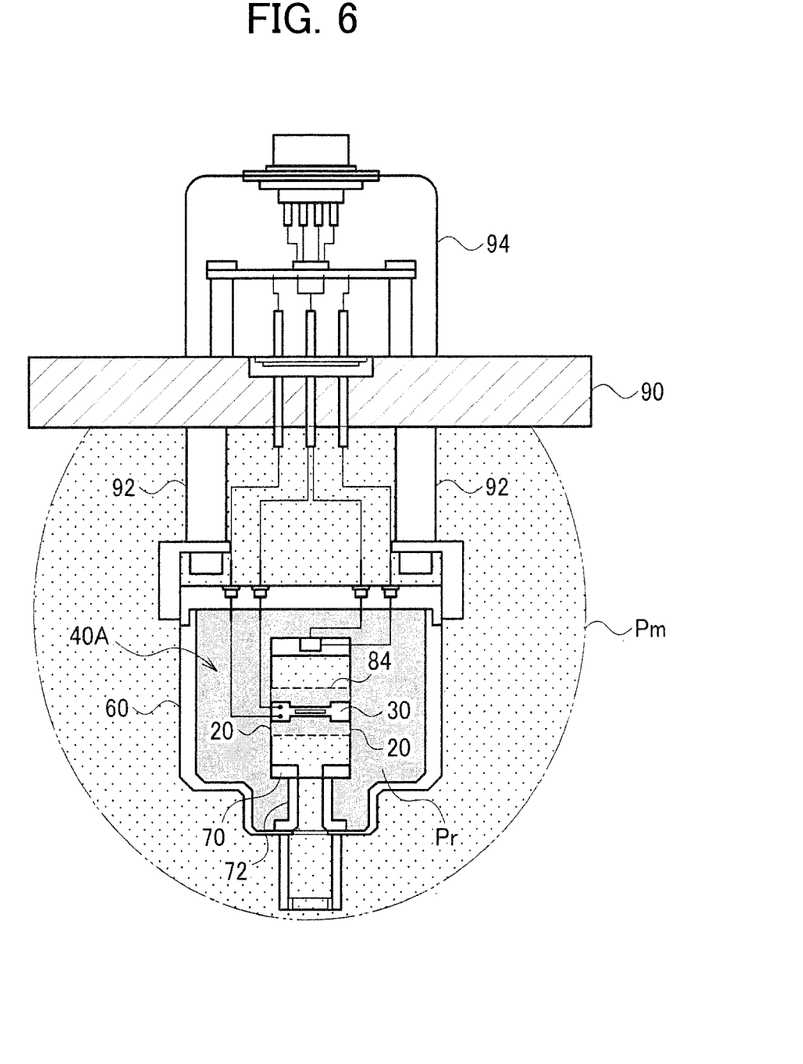
FIG. 6 is a sectional view illustrating yet another example of the diaphragm pressure gauge illustrated in FIG. 1.

Alternatively, as illustrated in FIG. 6, the structure 40 may include an outer structure 60, the airtight space 40A provided inside of the outer structure 60 is set to the reference vacuum (Pr), and an inner structure 70 that is disposed inside the outer structure 60 and insulated by the reference vacuum (Pr). The inner structure 70 can include an introduction pipe 72 that has an inlet for a gas at pressure to be measured at a protruding end that protrudes outward from the outer structure 60 and an inner chamber 74 that is set to the pressure to be measured (Pm) via the introduction pipe 72. In this case, the two diaphragms 20 function as partitions of a part of the inner chamber 74, the pressure to be measured (Pm) acts on the opposing surface 20A, and the reference vacuum (Pr) acts on the non-opposing surface 20B.

Figure 7:
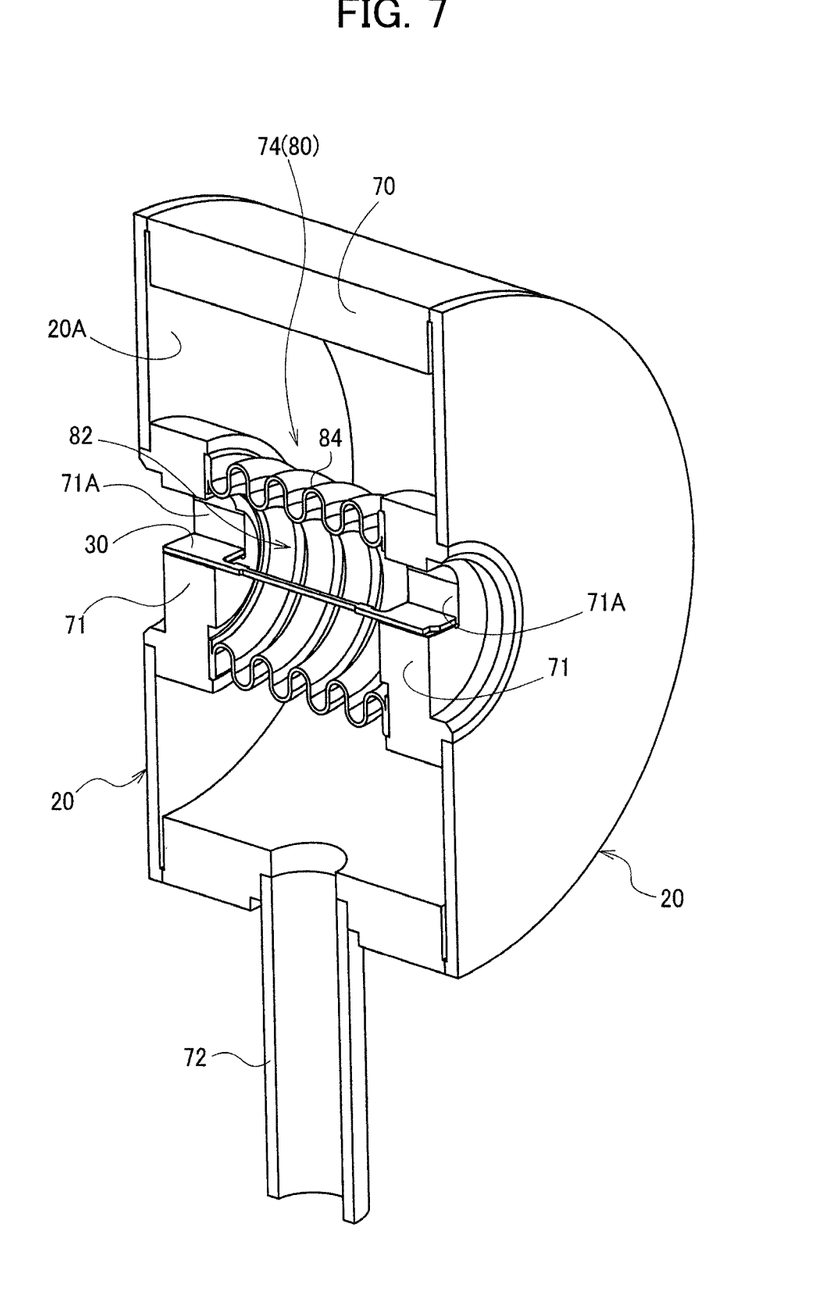
FIG. 7 is a sectional view of substantial parts of the diaphragm pressure gauge illustrated in FIG. 6.

As illustrated in FIG. 6 and FIG. 7, the inner chamber 74 can include a first chamber 80 set to the pressure to be measured (Pm) via the introduction pipe 72, a second chamber 82 that is communicated with the airtight space 40A inside the outer structure 60 and airtightly separated from the first chamber 80, and bellows 84 that partitions the first chamber 80 and the second chamber 82, that is coupled to the two diaphragms 20, and that is capable of deforming so as to allow displacements of the two diaphragms. In this case, of the two diaphragms 20, the opposing surface 20A is disposed so as to face the inside of the first chamber 80 and the piezoelectric element 30 is disposed in the second chamber 82.

The inner structure 70 can further include two rigid bodies 71 that couple the two diaphragms 20 and the bellows 84 to each other. As illustrated in FIG. 7, each of the rigid bodies 71 can include an opening 71A that communicates the airtight space 40A set to the reference vacuum (Pr) and the second chamber 82 with each other. Accordingly, the inside of the bellows 84 is set to the reference vacuum (Pr) via a central hole formed in the two diaphragms 20 and the opening 71A. Accordingly, the piezoelectric element 30 is disposed under the reference vacuum (Pr) and the airtight space 40A surrounding the piezoelectric element 30 is also set to the reference vacuum (Pr). Therefore, a heat blocking effect exhibits characteristics C2 illustrated in FIG. 2 and is not affected by temperature. For example, even when a heat source such as an evaporation source is present under the pressure to be measured, there is hardly any effect of temperature. In this manner, measurement accuracy of pressure can be further increased.

2. Second Embodiment

Figure 8:
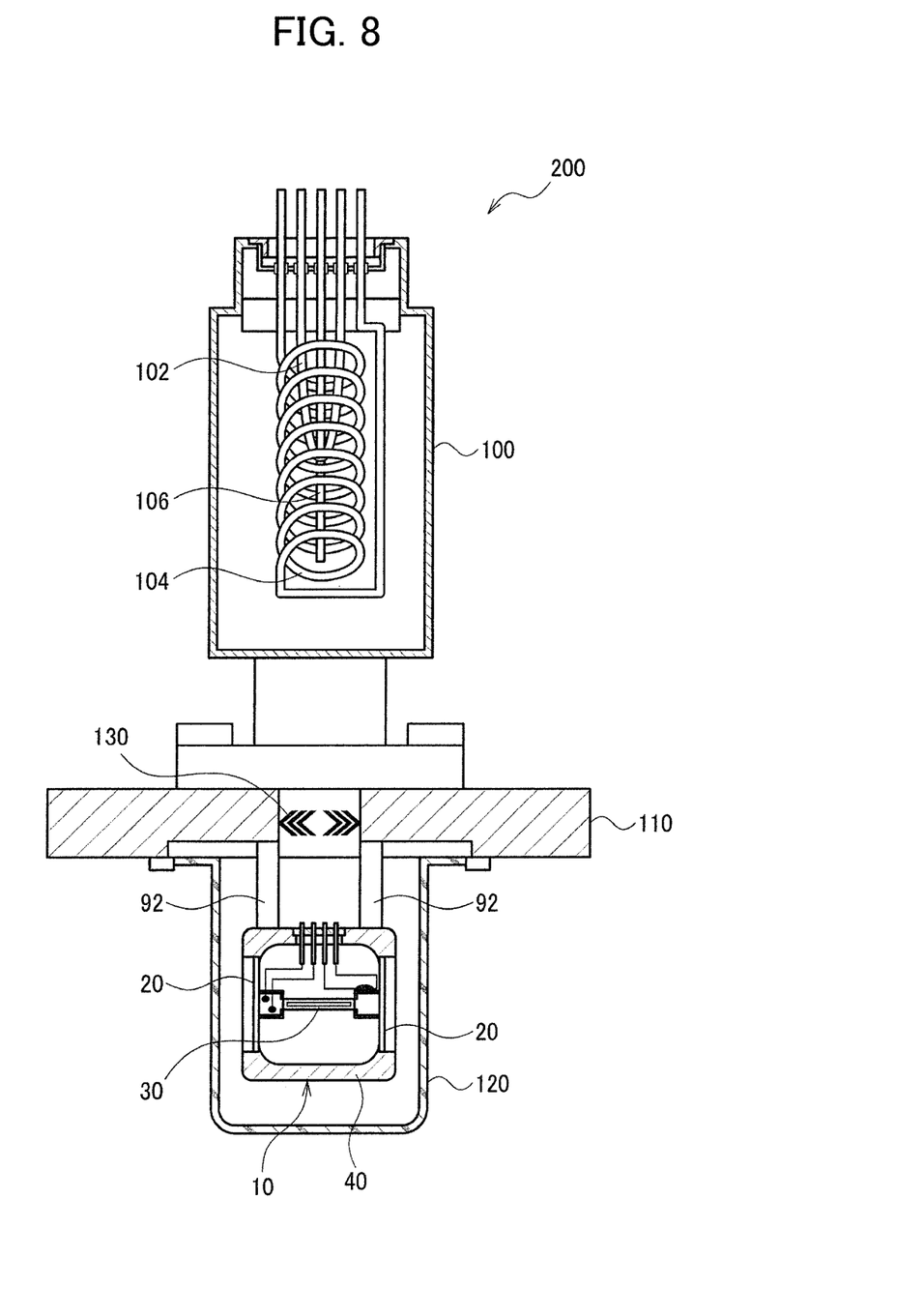
FIG. 8 is a sectional view illustrating a compound pressure gauge according to a second embodiment of the disclosure.

A compound pressure gauge 200 according to a second embodiment of the disclosure includes the diaphragm pressure gauge 10 according to the first embodiment of the disclosure and an ionization vacuum gauge 100. The diaphragm pressure gauge 10 and the ionization vacuum gauge 100 are coupled by a coupling member 110 and are both disposed under the pressure to be measured (Pm). The coupling member 110 is fixed to a vacuum chamber.

In this case, the ionization vacuum gauge 100 is configured as a hot cathode ionization gauge (a type that heats a filament and extracts thermions) or a cold cathode ionization gauge (a type that extracts electrons by field emission). In this case, a description will be given using a hot cathode ionization gauge as an example of the ionization vacuum gauge 100. For example, the hot cathode ionization gauge 100 includes a filament 102, a grid 104, and a collector 106. When the filament 102 is energized, electrons are emitted from the filament 102. Electrons emitted from the filament 102 perform several reciprocating movements while heading towards the grid 104 and, during the movements, the electrons ionize a gas under the pressure to be measured (Pm). The higher the pressure to be measured (Pm), the larger the numbers of molecules and atoms to be ionized. Pressure can be indirectly measured by measuring an ionic current created by ionized molecules and atoms flowing into the collector 106 having been negatively biased under a condition that a current (emission current) of thermions emitted from the filament 102 is constant.

Figure 11:
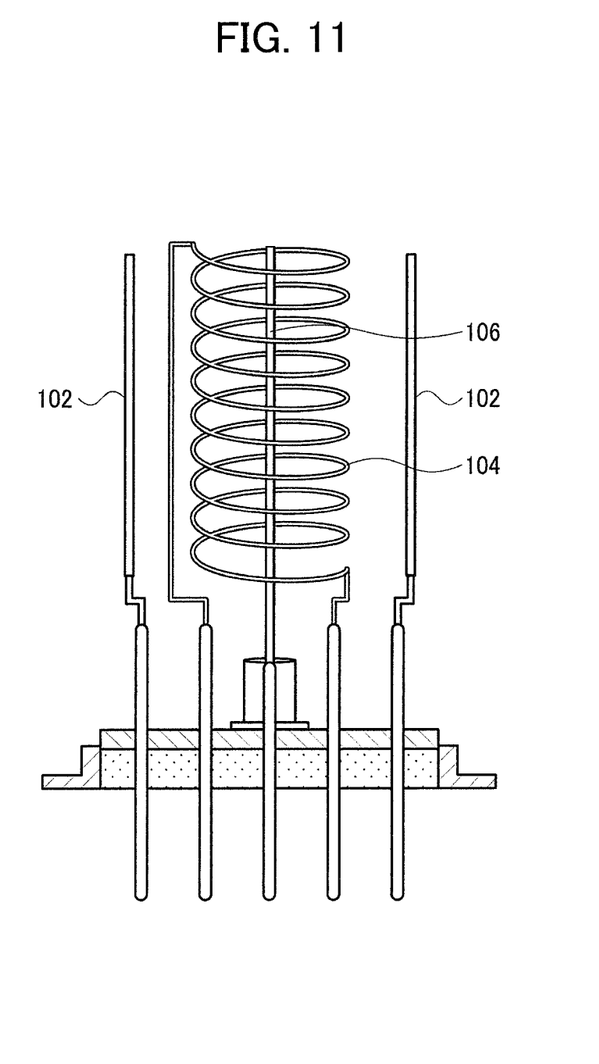
FIG. 11 is a diagram illustrating a modification in which an arrangement of a filament illustrated in FIG. 8 has been changed.

In this case, as illustrated in FIG. 11, the filament 102 is more preferably disposed on an outer side of the spiral grid 104 in the hot cathode ionization gauge 100. Only one filament 102 may be disposed on the outer side. Accordingly, a decline in sensitivity can be suppressed even when the pressure to be measured (Pm) is relatively high. This is because molecules and atoms ionized by electrons emitted from the filament 102 are prevented from flowing into the collector 106 on an inner side of the spiral grid 104. Another reason is that molecules and atoms ionized by electrons emitted from the filament 102 can flow into a casing of the hot cathode ionization gauge 100 and the ionic current does not excessively increase even when the pressure to be measured (Pm) is relatively high.

Figure 9:
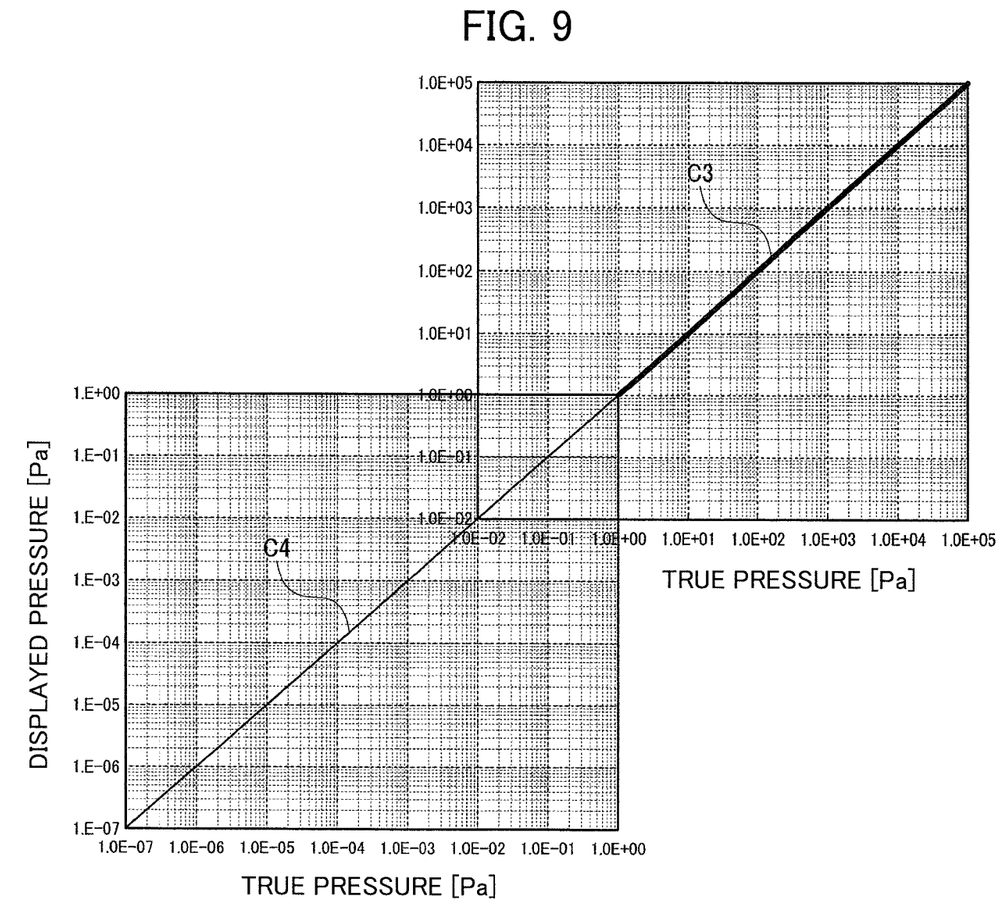
FIG. 9 is a characteristic diagram illustrating a range of pressure to be measured of the compound pressure gauge.
Figure 10:
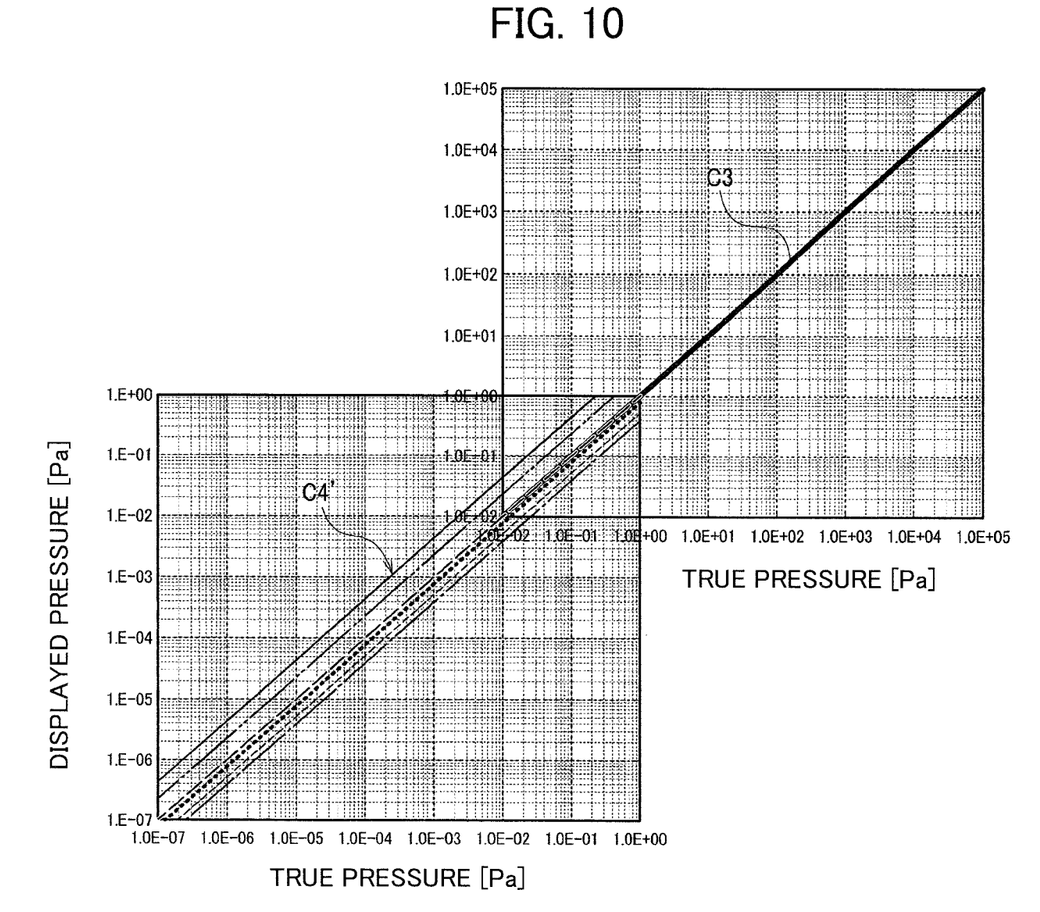
FIG. 10 is a characteristic diagram that serves as a basis of the characteristics illustrated in FIG. 9 indicating that a difference in sensitivity depending on gas species occurs in an ionization vacuum gauge among the compound pressure gauge.

FIG. 9 and FIG. 10 illustrate pressure characteristics of the compound pressure gauge 200. FIG. 10 is a characteristic diagram that serves as a basis of the characteristics illustrated in FIG. 9 indicating that a difference in sensitivity depending on gas species occurs in an ionic current of the ionization vacuum gauge 100 (characteristics C4') among the compound pressure gauge 200. However, in the ionization vacuum gauge 100, since a proportional relationship is guaranteed between an ionic current and pressure, relative accuracy of pressure is as reliable as accuracy of reading. In consideration thereof, in the characteristics illustrated in FIG. 9 that are adopted in the present embodiment, a level of a measured value of the diaphragm pressure gauge 10 (characteristics C3) is shifted on software to an upper-limit ionic current value of characteristics C4 of the ionization vacuum gauge 100 (a specific gas equivalent such as a nitrogen equivalent of an ionic current value with a proportional relationship between pressures regardless of gas species). Accordingly, with the compound pressure gauge 200 using the diaphragm pressure gauge 10 and the ionization vacuum gauge 100, true pressure is obtained as displayed pressure of the ionization vacuum gauge 100 regardless of a composition of a gas to be measured.

As illustrated in FIG. 9, the diaphragm pressure gauge 10 has a measurement range of, for example, atmospheric pressure ($10^{+5}$ Pa) to a medium vacuum ($10^{-2}$ Pa) and the ionization vacuum gauge 100 has a measurement range of, for example, a medium vacuum (1 Pa) to an ultrahigh vacuum ($10^{-7}$ Pa). In this manner, the compound pressure gauge 200 can adopt a range of, for example, atmospheric pressure ($10^{+5}$ Pa) to an ultrahigh vacuum ($10^{-7}$ Pa) as a measurement range. While the measurement region of the diaphragm pressure gauge 10 and the measurement region of the ionization vacuum gauge 100 overlap with each other by a range of 0.01 to 1.0 Pa in this example, the overlap region is not limited thereto. The overlap region may be 0.1 to 10.0 Pa, 0.1 to 1.0 Pa, or the like. In the present embodiment, since the measurement range of the diaphragm pressure gauge 10 has expanded, a region from atmospheric pressure to an ultrahigh vacuum (for example, $10^{-7}$ Pa) can be measured by the compound pressure gauge 200 that is made up of the diaphragm pressure gauge 10 and the ionization vacuum gauge 100.

Since the compound pressure gauge 200 is disposed under the pressure to be measured (Pm), a temperature of a measuring atmosphere is always the same as a temperature of an atmosphere under the pressure to be measured (Pm). In this case, in the pressure to be measured (Pm) from atmospheric pressure to a low vacuum, measurement error with respect to a temperature fluctuation in ambient air is small and the pressure to be measured (Pm) in this range can be measured by the diaphragm pressure gauge according to one of some aspects of the disclosure that does not include a heat source. On the other hand, the pressure to be measured (Pm) at a high vacuum or an ultrahigh vacuum is mainly measured by the hot cathode ionization gauge 100 that includes a heat source. In the hot cathode ionization gauge 100, with respect to a difference in sensitivity depending on gas species, since a proportional relationship is guaranteed between an ionic current and pressure, relative accuracy of pressure is as reliable as accuracy of reading. Therefore, the pressure to be measured (Pm) from atmospheric pressure to a high vacuum or an ultrahigh vacuum can be accurately measured.

Instead of constantly energizing the filament 102 of the hot cathode ionization gauge 100 during measurement, energization of the filament 102 may be turned on/off depending on a pressure value measured by the diaphragm pressure gauge 10. For example, energization of the filament 102 can be turned on when the pressure value measured by the diaphragm pressure gauge 10 is close to a measured upper limit or equal to or lower than the measured upper limit of the hot cathode ionization gauge 100 illustrated in FIG. 9. In this manner, an adverse effect of the filament 102 being a heat source on the diaphragm pressure gauge 10 can be reduced.

In addition, a zero point correction of the diaphragm pressure gauge 10 may be performed when the pressure to be measured (Pm) that is lower than a measured lower limit ($10^{-2}$ Pa in FIG. 9) of the diaphragm pressure gauge 10 is to be measured by the hot cathode ionization gauge 100. This is because, at the pressure to be measured (Pm) that is lower than the measured lower limit of the diaphragm pressure gauge 10, a measured value of the diaphragm pressure gauge 10 should be zero.

As illustrated in FIG. 8, a shield member 120 being a deposition preventive shield and/or a heat shield that surrounds the structure 40 may be further disposed. Since the shield member 120 is at least partially capable of allowing the gas to be measured to pass, the inside of the shield member 120 can be set to pressure of gas to be measured. In FIG. 8, an entirety of the shield member 120 is formed of a porous sintered body such as ceramics. Accordingly, air permeability of the shield member 120 with respect to the gas to be measured is secured. In addition, even when, for example, a deposition source is disposed under the pressure to be measured (Pm) outside of the shield member 120, particles or heat from the deposition source can be blocked by the shield member 120. In other words, the shield member 120 has a function as a deposition preventive shield that blocks particles from a deposition source and prevents a film from forming on the diaphragm pressure gauge 10 and a function as a heat shield that prevents heat from the deposition source (heat source) from being transferred to the diaphragm pressure gauge 10. The shield member 120 may be an air-impermeable heat shield body that at least partially includes a filter or a baffle (baffle plate). In this case, air permeability and a function of a deposition preventive shield are secured by the filter or the baffle.

As illustrated in FIG. 8, a heat shield member 130 can be added to the coupling member 110. The heat shield member 130 can be made of a baffle (baffle plate). Accordingly, transfer of heat from the heat source (filament) of the hot cathode ionization gauge 100 to the diaphragm pressure gauge 10 can be prevented by the heat shield member 130.

The disclosure is not limited to the embodiments described above and various modifications are possible within the scope of the gist of the disclosure. For example, the shield member 120 illustrated in FIG. 8 that is a deposition preventive shield and/or a heat shield may be further disposed so as to surround the structure 40 illustrated in FIG. 1.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:
1. A diaphragm pressure gauge, comprising:
a structure disposed under pressure to be measured;
two diaphragms attached to the structure so as to oppose each other; and
a detection element having both ends that are fixed to the two diaphragms to detect displacements of the two diaphragms, wherein the two diaphragms include two opposing surfaces and two non-opposing surfaces, an airtight space surrounded by the structure and the two diaphragms is kept in a reference vacuum, and the two diaphragms are displaced according to a differential pressure between the reference vacuum acting on the two opposing surfaces and the pressure to be measured acting on the two non-opposing surfaces, and the displacements of the two diaphragms have equal absolute values in opposite directions.

2. The diaphragm pressure gauge according to claim 1, wherein the structure is attached via a thermal insulator to a fixing member that disposes and fixes the structure under the pressure to be measured.

3. The diaphragm pressure gauge according to claim 1, further comprising a deposition preventive shield and/or a heat shield that surrounds the structure and that is at least partially capable of allowing a gas to be measured to pass.

4. The diaphragm pressure gauge according to claim 1, wherein the detection element is a crystal oscillator.

5. A compound pressure gauge comprising:
the diaphragm pressure gauge according to claim 4; and
an ionization vacuum gauge disposed under pressure to be measured,
wherein a measurement region of the diaphragm pressure gauge and a measurement region of the ionization vacuum gauge overlap with each other.

6. The compound pressure gauge according to claim 5, wherein a measurement region of the diaphragm pressure gauge and a measurement region of the ionization vacuum gauge overlap with each other by a range of 0.01 to 10.0 Pa.

7. The compound pressure gauge according to claim 5, wherein an ionic current value of the ionization vacuum gauge is converted into a nitrogen equivalent, and a level of a measured value of the diaphragm pressure gauge is shifted so as to be consistent with an upper limit of the nitrogen equivalent of the ionization vacuum gauge.

8. A method for measuring pressure by a diaphragm pressure gauge, comprising:
preparing the diaphragm pressure gauge under pressure to be measured, wherein the diaphragm pressure gauge includes a structure, two diaphragms attached to the structure so as to oppose each other in which the two diaphragms include two opposing surfaces and two non-opposing surfaces, and a detection element having both ends that are fixed to the two diaphragms to detect displacements of the two diaphragms;
keeping an airtight space surrounded by the structure and the two diaphragms in a reference vacuum;
subjecting the two non-opposing surfaces to the pressure to be measured; and
displacing the two diaphragms according to a differential pressure between the reference vacuum acting on the two opposing surfaces and the pressure to be measured acting on the two non-opposing surfaces, wherein the displacements of the two diaphragms have equal absolute values in opposite directions.

9. The method for measuring pressure by a diaphragm pressure gauge according to claim 8, wherein the structure is attached via a thermal insulator to a fixing member that disposes and fixes the structure under the pressure to be measured.

10. The method for measuring pressure by a diaphragm pressure gauge according to claim 8, further comprising
surrounding the structure by a deposition preventive shield and/or a heat shield that is at least partially capable of allowing a gas to be measured to pass.

11. The method for measuring pressure by a diaphragm pressure gauge according to claim 8, wherein the detection element is a crystal oscillator.

12. A method for measuring pressure by a compound pressure gauge comprising:
providing the compound pressure gauge under pressure to be measured, wherein the compound pressure gauge includes a diaphragm pressure gauge and an ionization vacuum gauge, wherein the diaphragm pressure gauge has a structure, wherein two diaphragms are attached to the structure to oppose each other, wherein the two diaphragms include two opposing surfaces and two non-opposing surfaces, and wherein a crystal oscillator is fixed to the two diaphragms to detect displacements of the two diaphragms;
keeping an airtight space surrounded by the structure and the two diaphragms in a reference vacuum; and
subjecting the two non-opposing surfaces to the pressure to be measured while overlapping a pressure measurement region of the diaphragm pressure gauge and a pressure measurement region of the ionization vacuum gauge with each other.

13. The method for measuring pressure by a compound pressure gauge according to claim 12, wherein the measurement region of the diaphragm pressure gauge and the measurement region of the ionization vacuum gauge overlap each other by a range of 0.01 to 10.0 Pa.

14. The method for measuring pressure by a compound pressure gauge according to claim 12, further comprising:
converting an ionic current value of the ionization vacuum gauge into a nitrogen equivalent, and
shifting a level of a measured value of the diaphragm pressure gauge so as to be consistent with an upper limit of the nitrogen equivalent of the ionization vacuum gauge.

* * * * *